(12) United States Patent
Sasaki et al.

(10) Patent No.: US 11,086,026 B2
(45) Date of Patent: Aug. 10, 2021

(54) NAVIGATION SYSTEM, NAVIGATION METHOD, AND AIRCRAFT

(71) Applicant: SUBARU CORPORATION, Tokyo (JP)

(72) Inventors: Yutaka Sasaki, Tokyo (JP); Akitoshi Sakaguchi, Tokyo (JP); Akihiro Yamane, Tokyo (JP); Toshiyuki Narahashi, Tokyo (JP); Yoichi Onomura, Tokyo (JP); Kumiko Kindaichi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 218 days.

(21) Appl. No.: 16/411,556

(22) Filed: May 14, 2019

(65) Prior Publication Data

US 2019/0383949 A1 Dec. 19, 2019

(30) Foreign Application Priority Data

Jun. 14, 2018 (JP) .............................. JP2018-113960

(51) Int. Cl.
*G01S 19/46* (2010.01)
(52) U.S. Cl.
CPC .................... *G01S 19/46* (2013.01)
(58) Field of Classification Search
CPC .......... G01S 19/46; G01S 19/48; G01S 19/41; G01S 19/05; G01S 19/11

USPC ..................................................... 342/357.29
See application file for complete search history.

(56) References Cited

U.S. PATENT DOCUMENTS

| 5,438,337 A | 8/1995 | Aguado |
| 5,572,218 A * | 11/1996 | Cohen ..................... G01S 19/04 342/357.42 |
| 2002/0173305 A1 * | 11/2002 | Forman .............. H04B 7/18508 455/431 |

FOREIGN PATENT DOCUMENTS

| JP | H9-503058 A | 3/1997 |
| JP | 2003-517762 A | 5/2003 |
| JP | 2007-232688 A | 9/2007 |

* cited by examiner

*Primary Examiner* — Harry K Liu
(74) *Attorney, Agent, or Firm* — Troutman Pepper Hamilton Sanders LLP

(57) ABSTRACT

A navigation system includes a receiver and a signal processor. The receiver is mounted on a second aircraft. The second aircraft is an acquisition target of location information. The receiver is configured to receive a navigation signal from each of three or more first aircrafts. The navigation signal includes the location information on a location of the corresponding first aircraft. The navigation signal is transmitted as a radio signal from a navigation apparatus mounted on each of the three or more first aircrafts. The signal processor is mounted on the second aircraft. The signal processor is configured to calculate a location of the second aircraft on the basis of the navigation signal.

17 Claims, 3 Drawing Sheets

NAVIGATION SYSTEM, NAVIGATION METHOD, AND AIRCRAFT

CROSS-REFERENCE TO RELATED APPLICATIONS

The present application claims priority from Japanese Patent Application No. 2018-113960 filed on Jun. 14, 2018, the entire contents of which are hereby incorporated by reference.

BACKGROUND

Some embodiments of the technology relate to a navigation system, a navigation method, and an aircraft.

A navigation system (or a navigation apparatus) using a global positioning system (GPS) has been known as a representative system for guiding a movable object such as an aircraft to a destination (see Japanese Unexamined Patent Application Publication (Translation of PCT Application) No. H09-503058 and Japanese Unexamined Patent Application Publication No. 2003-517762, for example). Here, the GPS is managed by United State of America. The navigation system using the GPS detects a spatial location of a movable object on which a GPS receiver is mounted by receiving radio waves from a plurality of GPS satellites by means of the GPS receiver. It is to be noted that an official name of the GPS satellite is a NAVSTAR (Navigation Satellite with Time and Ranging).

The GPS satellite flies at altitude of about 20,000 km. The intensity of a GPS signal transmitted from the GPS satellite is therefore weaker than the intensity of the other radio signal for data link. Therefore, in a case where radio interference (jammer) is transmitted, it may be difficult to receive the GPS signal in an effective range of the radio interference. Radio interfering (jamming) and deception by a signal disguised as a GPS signal have actually been reported. Therefore, a technique to suppress radio interfering of a GPS signal has been proposed (see Japanese Unexamined Patent Application Publication No. 2007-232688, for example).

Non-limiting examples of a global navigation satellite system (GNSS), such as the GPS, using artificial satellites may include global'naya navigatsionnaya sputnikovaya sistema (GLONASS) of Russia and Galileo that is being planned by the European Union. It is to be noted that a navigational satellite system (NSS) suitable for a specific region is called a regional navigational satellite system (RNSS).

Most of navigation systems for a movable object such as an aircraft depend on the GPS at present. Therefore, it may be important to develop and operate a navigation system that can be used also under an environment under which it is difficult to receive a GPS signal.

A long-range navigation (Loran) system and an Omega radio navigation system have been known as a navigation system in which a GPS signal is not utilized. In each of the Loran system and the Omega radio navigation system, a radio signal is transmitted from a base station installed on the ground. The Loran system and the Omega radio navigation system can be used to the vicinity of see surface height.

The Loran system and the Omega radio navigation system use a geometry theorem. In the geometry theorem, a locus of a point where a distance difference from two points becomes constant is drawn as a hyperbola. For example, a navigation system of an aircraft receives navigation signals transmitted from respective three or more base stations, and a location of an aircraft is identified as an intersection point of two hyperbolas. The two hyperbolas are drawn on the basis of a difference in arrival times of the navigation signals. Such navigation of identifying the location of the aircraft as the intersection point of the two hyperbolas is called hyperbola navigation.

In the Loran systems, a Loran system in which a radio signal whose frequency is 100 kHz is used as a navigation signal is called Loran-C, and a Loran system in which a radio signal whose frequency is from 1750 kHz to 1950 kHz is used as a navigation signal is called Loran-A. The navigation signal used in the Loran-C corresponds to a long wave (LF: Low Frequency) that is a radio wave whose frequency is from 30 kHz to 300 kHz.

In the Omega radio navigation system, a radio signal whose frequency is from 10.2 kHz to 13.6 kHz is used as a navigation signal. The navigation signal used in the Omega radio navigation system corresponds to an ultra-long wave (VLF: Very Low Frequency) that is a radio wave whose frequency is from 3 kHz to 30 kHz.

As described above, in the Loran system and the Omega radio navigation system, the radio signal having a frequency in an LF zone or VLF zone is mainly used. Therefore, by using a ground wave, positioning can be performed outside a range of linear distance (LOS: Line of Sight). The LOS is obtained by connecting between a transmitter provided in a base station and a receiver provided in a movable object such as an aircraft.

SUMMARY

An aspect of the technology provides a navigation system that includes a receiver and a signal processor. The receiver is mounted on a target aircraft. The target aircraft is a target of acquisition of location information. The receiver is configured to receive three or more navigation signals from respective three or more non-target aircrafts. The three or more navigation signals each include location information on a location of corresponding one of the three or more non-target aircrafts. The three or more navigation signals are each transmitted as a radio signal from a navigation apparatus mounted on the corresponding one of the three or more non-target aircrafts. The signal processor is mounted on the target aircraft. The signal processor is configured to calculate a location of the target aircraft on the basis of the three or more navigation signals.

An aspect of the technology provides a navigation system that includes three or more first navigation apparatuses and a second navigation apparatus. The three or more first navigation apparatuses are mounted on respective three or more non-target aircrafts. The three or more first navigation apparatuses are each configured to receive three or more satellite navigation signals transmitted from respective three or more artificial satellites, and calculate a location of corresponding one of the three or more non-target aircrafts on the basis of the received three or more satellite navigation signals. The three or more first navigation apparatuses are configured to transmit respective three or more navigation signals as radio signals. The three or more navigation signals each include location information on the calculated location of the corresponding one of the three or more non-target aircrafts. The second navigation apparatus is mounted on a target aircraft. The target aircraft is a target of acquisition of location information. The second navigation apparatus is configured to receive the three or more navigation signals, and calculate a location of the target aircraft on the basis of the received three or more navigation signals.

An aspect of the technology provides an aircraft on which a navigation system is mounted. The navigation system includes a receiver and a signal processor. The receiver is mounted on a target aircraft. The target aircraft is a target of acquisition of location information. The receiver is configured to receive three or more navigation signals from respective three or more non-target aircrafts. The three or more navigation signals each include location information on a location of corresponding one of the three or more non-target aircrafts. The three or more navigation signals are each transmitted as a radio signal from a navigation apparatus mounted on the corresponding one of the three or more non-target aircrafts. The signal processor is mounted on the target aircraft. The signal processor is configured to calculate a location of the target aircraft on the basis of the three or more navigation signals.

An aspect of the technology provides a navigation method of calculating a location of an aircraft by a navigation system. The navigation system includes a receiver and a signal processor. The receiver is mounted on a target aircraft. The target aircraft is a target of acquisition of location information. The receiver is configured to receive three or more navigation signals from respective three or more non-target aircrafts. The three or more navigation signals each include location information on a location of corresponding one of the three or more non-target aircrafts. The three or more navigation signals are each transmitted as a radio signal from a navigation apparatus mounted on the corresponding one of the three or more non-target aircrafts. The signal processor is mounted on the target aircraft. The signal processor is configured to calculate a location of the target aircraft on the basis of the three or more navigation signals. The aircraft is the target of acquisition of the location information.

An aspect of the technology provides a navigation method including: receiving three or more satellite navigation signals by each of three or more first navigation apparatuses, the three or more satellite navigation signals being transmitted from respective three or more artificial satellites, the three or more first navigation apparatuses being mounted on respective three or more non-target aircrafts in flight; calculating each of three or more locations of the respective three or more non-target aircrafts on the basis of the received three or more satellite navigation signals; transmitting, from the respective three or more first navigation apparatus, three or more navigation signals as radio signals, the three or more navigation signals each including location information on the location of corresponding one of the three or more non-target aircrafts; receiving the three or more navigation signals by a second navigation apparatus, the second navigation apparatus being mounted on a target aircraft in flight, the target aircraft being a target of acquisition of location information; and calculating a location of the target aircraft on the basis of the received three or more navigation signals.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
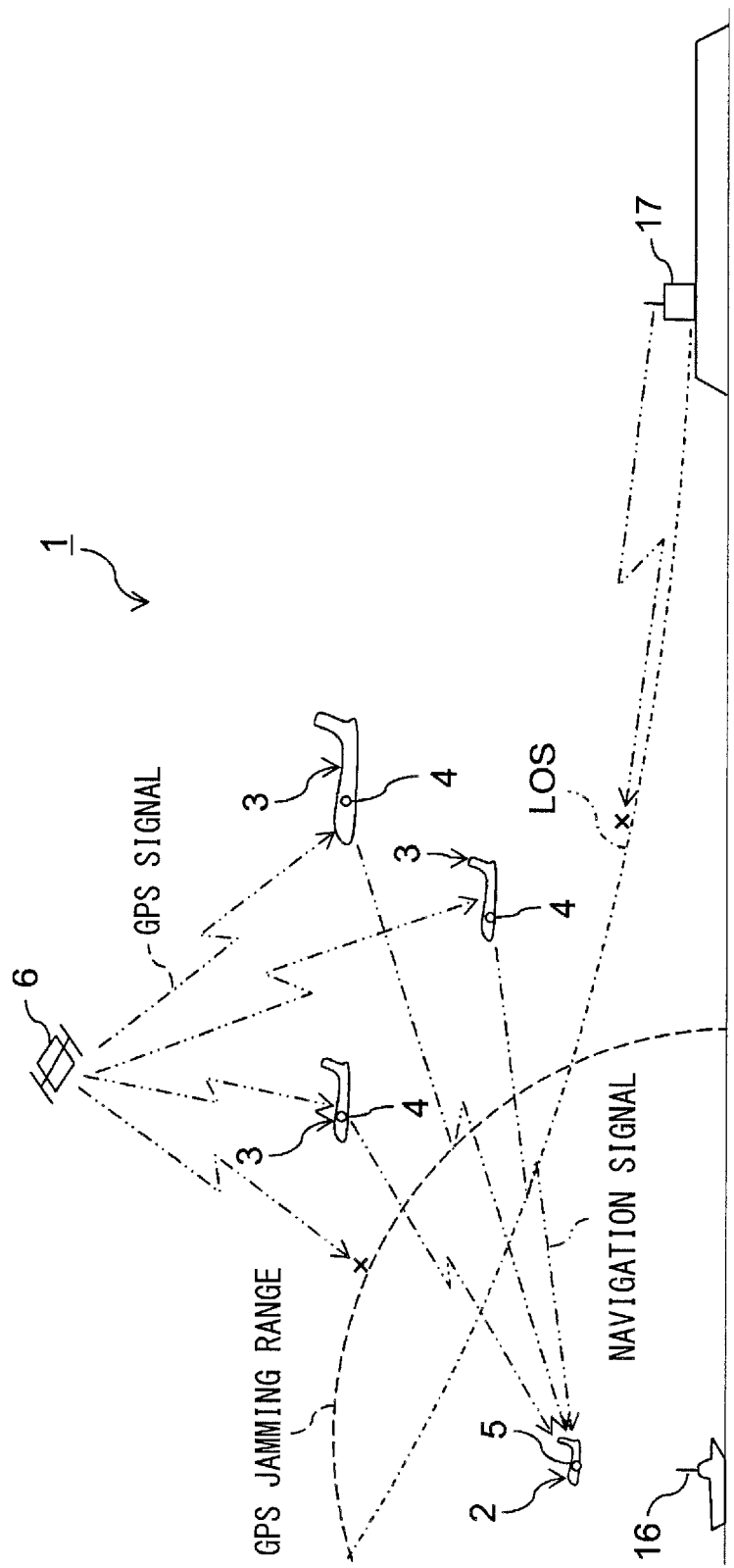
FIG. 1 is a diagram illustrating an example of a general configuration of a navigation system according to an embodiment of the technology.

A navigation system, a navigation method, and an aircraft according to an embodiment of the technology will be described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

The number of base stations used for a Loran system or an Omega radio navigation system decreases as a result of the spread of a GPS. Therefore, a range of use of the Loran system or the Omega radio navigation system is restrictive. Further, in the Loran system and the Omega radio navigation system, there is a problem that transmitting equipment required for a base station is large sized. Moreover, there is also a problem that navigation accuracy is deteriorated due to a low frequency of a navigation signal.

It is desirable to allow an aircraft to be navigated with sufficient accuracy also in a case where a navigation signal transmitted from each of artificial satellites, such as a GPS signal, cannot be utilized.

Configuration and Operation of Navigation System

Figure 2:
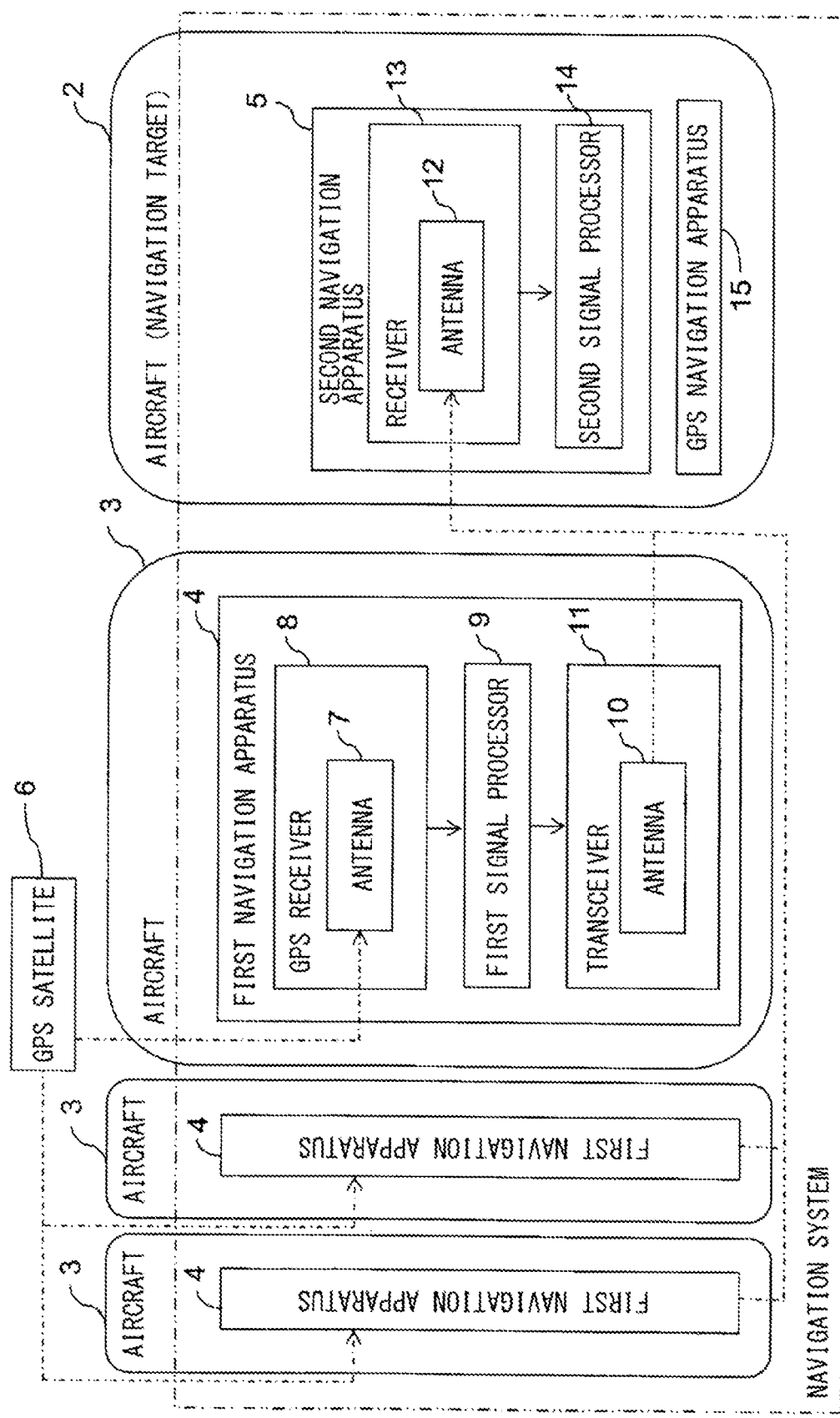
FIG. 2 is a diagram illustrating an example of a detailed configuration of the navigation system illustrated in FIG. 1.

FIG. 1 is a diagram illustrating an example of a general configuration of a navigation system according to an embodiment of the technology. FIG. 2 is a diagram illustrating an example of a detailed of the navigation system illustrated in FIG. 1.

A navigation system 1 may be directed to acquisition of a location of an aircraft 2. The aircraft 2 may be a target of acquisition of location information. For example, the navigation system 1 may calculate a location of each of three or more other aircrafts 3 on the basis of GPS signals. Further, the navigation system 1 may acquire the location of the aircraft 2 on the basis of the locations of the respective three or more other aircrafts 3. Therefore, part of the navigation system 1 may be mounted on the aircraft 2, while the other part of the navigation system 1 may be mounted on each of the three or more other aircrafts 3. In one embodiment, the aircraft 2 may serve as a "target aircraft". In one embodiment, the aircraft 3 may serve as a "non-target aircraft".

For example, the navigation system 1 may include a plurality of first navigation apparatuses 4 and a second navigation apparatus 5. The first navigation apparatuses 4 may be mounted on the respective three or more aircrafts 3. The second navigation apparatus 5 may be mounted on the aircraft 2.

Each of the first navigation apparatuses 4 may be a satellite navigation communication apparatus. Each of the first navigation apparatuses 4 may receive a satellite navigation signal that is transmitted, as a radio signal, from each of three or more artificial satellites such as GPS satellites 6. Each of the first navigation apparatuses 4 may thereafter calculate a location of the corresponding aircraft 3, on which the first navigation apparatus 4 is mounted, on the basis of the received satellite navigation signals. Since the first navigation apparatus 4 is mounted on each of the three or more aircrafts 3, the respective locations of the three or more aircrafts 3 may be calculated by the respective first navigation apparatuses 4 mounted on the respective three or more aircrafts 3.

Each of the three or more aircrafts 3 on which the first navigation apparatus 4 is mounted may move. Therefore, the location of each of the aircrafts 3 that is calculated by the corresponding first navigation apparatus 4 may vary temporally. Therefore, each of the first navigation apparatuses 4 may acquire time-series location information that indicates the location of the corresponding aircraft 3 at each clock time.

Further, each of the first navigation apparatuses 4 may transmit location information as a navigation signal. The location information may indicate the calculated location of each of the aircrafts 3 at each clock time. Therefore, the navigation signal may be transmitted, as the radio signal, from each of the first navigation apparatuses 4 mounted on the respective three or more aircrafts 3. The navigation signal may include the location information on the location of the corresponding aircraft 3.

Hereinafter, as illustrated in FIG. 1, a case where the artificial satellite is a GPS satellite 6 and the satellite navigation signal is a GPS signal will be described as an example. However, a case where a location of each of the three or more aircrafts 3 is detected on the basis of satellite navigation signals transmitted from another artificial satellite may be similar.

As illustrated in FIG. 1, in a case where the location of each of the three or more aircrafts 3 is detected on the basis of the GPS signals, each of the first navigation apparatuses 4 may include a GPS receiver 8, a first signal processor 9, and a transceiver (or a radio) 11. The GPS receiver 8 may include an antenna 7 configured to receive a GPS signal. The first signal processor 9 may calculate a location of the corresponding aircraft 3, on which the GPS receiver 8 is mounted, by known signal processing based on the GPS signals received by the GPS receiver 8. The location of each of the aircrafts 3 may contain latitude, longitude, and altitude at each clock time. The first signal processor 9 may also convert the location information on the acquired location of the corresponding aircraft 3 at each clock time into the navigation signal. The transceiver 11 may include an antenna 10 configured to transmit, as the radio signal, the navigation signal generated by the first signal processor 9. It is to be noted that the first signal processor 9 may include circuitry configured to process an electric signal.

The second navigation apparatus 5 may be a navigation communication apparatus. The second navigation apparatus 5 may receive a plurality of navigation signals including the location information on the locations of the respective three or more aircrafts 3 transmitted from the respective first navigation apparatuses 4. The second navigation apparatus 5 may calculate the location of the aircraft 2 on the basis of the plurality of navigation signals including the received location information on the locations of the respective three or more aircrafts 3.

The second navigation apparatus 5 may include a receiver 13 and a second signal processor 14. The receiver 13 may include an antenna 12 configured to receive the navigation signal including the location information on the location of each of the three or more aircrafts 3. The navigation signal may be transmitted, as the radio signal, from the first navigation apparatus 4 mounted on each of the three or more aircrafts 3 other than the aircraft 2 that is the target of acquisition of the location information. The second signal processor 14 may calculate the location of the aircraft 2, on which the receiver 13 is mounted, by performing signal processing on the navigation signal received by the receiver 13. The location of the aircraft 2 may contain latitude, longitude, and altitude at each clock time. The second signal processor 14 may include circuitry configured to process an electric signal.

The location of the aircraft 2 at each clock time may be calculated by hyperbola navigation, for example. In the hyperbola navigation, a difference between two navigation signals in distance from a transmission location to a reception location may be acquired on the basis of a phase difference between the two navigation signals transmitted from two different locations as radio signals. A first hyperbola indicating locations at which the difference in the above-described distance becomes constant may be acquired. Moreover, a second hyperbola may be similarly acquired on the basis of a phase difference of another combination of two navigation signals transmitted from transmission locations. These transmission locations may include the same transmission location as one of the transmission locations of the two navigation signals for acquiring the first hyperbola, and a transmission location different from any of the transmission locations of the two navigation signals for acquiring the first hyperbola. A reception location of the three navigation signals may then be identified as an intersection point of the first hyperbola and the second hyperbola.

Therefore, hyperbola navigation calculation as described above may be executed by using three or more navigation signals transmitted from the first navigation apparatuses 4 mounted on the respective three or more aircrafts 3 that fly at different locations different from each other. This makes it possible to acquire the location of the aircraft 2 that is the reception location of the navigation signals. Namely, it is possible to acquire the location of the aircraft 2 on the basis of only the three or more navigation signals transmitted from the respective first navigation apparatuses 4 mounted on the respective three or more aircrafts 3 without using the GPS signals.

When GPS signals cannot be received by a GPS navigation apparatus 15 mounted on the aircraft 2, it may be necessary to acquire location information on the location of the aircraft 2 without using the GPS signals. Non-limiting examples may include a case where the aircraft 2 enters a radio interfering (jamming) range due to a GPS interfering signal transmitted from a signal transmitter 16. Further, in a case where the aircraft 2 is located outside coverage from a base station 17 installed on the ground such as that of a Loran system or that of an Omega radio navigation system, it may be difficult to receive a radio signal that may be an alternative to the GPS signal. Even though such a radio signal can be received, detection accuracy for the location of the aircraft 2 may be deteriorated significantly.

In a case where the GPS signal cannot be received by the GPS navigation apparatus 15 mounted on the aircraft 2, three or more aircrafts 3 that transmit respective navigation signals may be caused to fly outside a jamming range of the GPS signal. Each of the three or more aircrafts 3 flying outside the jamming range of the GPS signal can thereby receive the GPS signals. Therefore, it is possible to detect locations of the respective three or more aircrafts 3 as reference locations. This makes it possible to calculate the location of the aircraft 2 by the hyperbola navigation calculation by using the locations of the respective three or more aircrafts 3 as the reference locations.

Further, also in a case where the signal transmitter 16 transmits a GPS deceptive signal to cause the GPS navigation apparatus 15 of the aircraft 2 to recognize wrong location information, it is possible to determine that the GPS navigation apparatus 15 receives the deceptive signal by comparing the location information with location information outputted from the second signal processor 14. This makes it possible to avoid such deception by using an output of the second signal processor 14 without using an output of the GPS navigation apparatus 15.

For example, in a case where the aircraft 2 is forward deployed for defensive purposes, by arranging the three or more aircrafts 3 outside an air defense range by a surface-to-air missile (SAM) and the jamming range of the GPS signal, it is possible to perform navigation for the aircraft 2.

Non-limiting examples that the navigation for the aircraft 2 by the navigation system 1 is useful may include a case where a GPS interfering signal or a GPS deceptive signal simulating a GPS signal is transmitted from the signal transmitter 16 as described above. The GPS interfering signal or the GPS deceptive signal may be transmitted with an output higher than that of the true GPS signal. Therefore, it may be effective that the navigation signal utilized in the navigation system 1 is also transmitted with an output higher than that of the GPS signal from the viewpoint of heightening resistance to jamming.

The intensity of the navigation signal received by the aircraft 2 may also vary due to a distance from the aircraft 2 by which the navigation signal is received to each of the three or more aircrafts 3 that transmits the navigation signal. Namely, the longer the distance from the aircraft 2 by which the navigation signal is received to each of the three or more aircrafts 3 that transmits the navigation signal is, the more the intensity of the navigation signal received by the aircraft 2 may decrease.

Thus, the distance from each of the three or more aircrafts 3 that transmit the respective navigation signals to the aircraft 2 by which the navigation signals are received may be set within 500 km to transmit and receive the navigation signals. This may be effective from the viewpoint of setting the intensity of the navigation signal received by the aircraft 2 to sufficient intensity. Namely, in a case where the distance from each of the three or more aircrafts 3 that transmit the respective navigation signals to the aircraft 2 by which the navigation signal is received is set within 500 km, it is possible to cause the navigation signal to reach the aircraft 2 with intensity much greater than the intensity of the GPS signal from the GPS satellite 6, which is propagated over the distance of about 20,000 km.

Further, in a case where the navigation signal is transmitted with a frequency higher than 1950 kHz, it is possible to improve detection accuracy for the location of the aircraft 2 by the hyperbola navigation calculation compared with a case where the Loran system or the Omega radio navigation system is used. As a more suitable condition, the navigation signal may be transmitted as a radio signal of a microwave whose frequency is from 300 MHz to 3 GHz (UHF: Ultra High Frequency). This makes it possible to improve the detection accuracy for the location of the aircraft 2 compared with that in a case where a radio signal with a frequency lower than that of the UHF, such as LV or VLV, is used.

Navigation Method

Next, a navigation method of the aircraft 2 by the navigation system 1 will be described.

Figure 3:
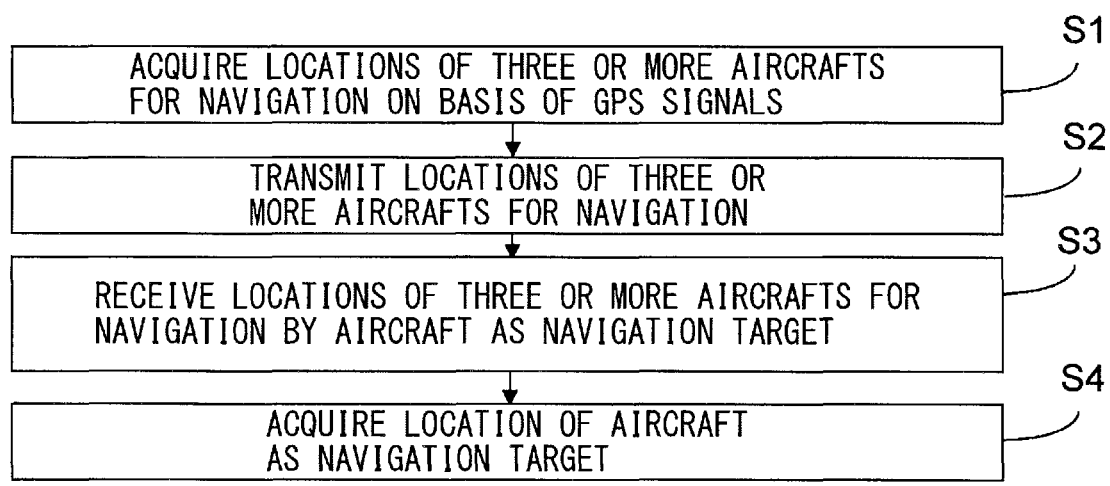
FIG. 3 is a flowchart illustrating a flow of calculating, by the navigation system illustrated in FIG. 1, a location of an aircraft 2 which is a target of acquisition of location information.

FIG. 3 is a flowchart illustrating a flow of calculating a location of the aircraft 2, which is a target of acquisition of location information, by the navigation system 1 illustrated in FIG. 1.

First, in Step S1, three or more aircrafts 3 for navigation, on each of which the first navigation apparatus 4 is mounted, may be arranged in a region where GPS signals can be received. Each of the first navigation apparatuses 4 may detect a location of the corresponding aircraft 3 on the basis of the GPS signals. For example, the three or more aircrafts 3 may fly on respective routes on which the three or more aircrafts 3 fly outside a jamming range of the GPS signals. The GPS receiver 8 of each of the first navigation apparatuses 4 mounted on the respective three or more aircrafts 3 in flight may receive the GPS signals transmitted from three or more GPS satellites 6. The first signal processor 9 of each of the first navigation apparatuses 4 may calculate a location of the corresponding aircraft 3 on the basis of the received GPS signals. Thus, the locations of the respective three or more aircrafts 3 may be acquired.

Subsequently, in Step S2, the transceiver 11 of each of the first navigation apparatuses 4 mounted on the respective three or more aircrafts 3 may transmit, as a radio signal, a navigation signal including location information on the location of the corresponding aircraft 3. From the viewpoint of improving navigation accuracy while countervailing jamming of the GPS signals, a navigation signal having an output higher than that of each of the GPS signals and a frequency higher than 1950 kHz, e.g., a navigation signal with UHF may be transmitted in one example. Further, in one example, the three or more aircrafts 3 may be arranged at locations within 500 km from the aircraft 2 that is the target of acquisition of the location information to transmit the navigation signals.

In contrast, the aircraft 2 as a target of navigation may be allowed to fly in a region where any GPS signal cannot be received. For example, the aircraft 2 may be allowed to fly inside the jamming range of the GPS signals.

Subsequently, in Step S3, the receiver 13 of the second navigation apparatus 5 mounted on the aircraft 2 in flight may receive the plurality of navigation signals including the location information on the location of each of the three or more aircrafts 3.

Subsequently, in Step S4, the second signal processor 14 of the second navigation apparatus 5 mounted on the aircraft 2 may calculate a location of the aircraft 2. Namely, the second signal processor 14 of the second navigation apparatus 5 mounted on the aircraft 2 may execute data processing such as hyperbola navigation calculation by using the locations of the respective three or more aircrafts 3 as input data. This makes it possible to acquire a spatial location of the aircraft 2, such as latitude, longitude, and altitude, at each clock time on the basis of the plurality of navigation signals including the location information on the locations of the respective three or more aircrafts 3.

Example Effects

According to the navigation system 1 and the navigation method as described above, by transmitting the navigation signals indicating spatial locations of the respective three or more aircrafts 3 from the three or more aircrafts 3, it is possible to acquire the location of the aircraft 2 as a target of navigation.

Therefore, according to the navigation system 1 and the navigation method, it becomes possible to perform navigation for the aircraft 2 without depending on the GPS. Further, since the navigation signals are transmitted from the aircrafts 3, it is possible to secure LOS unlike in a case where a navigation signal is transmitted from a base station installed on the ground. As a result, also in a case where the aircraft 2 as the target of navigation enters a jamming range for a GPS signal, etc., it is possible to perform navigation for the aircraft 2 by using a radio signal.

Other Example Embodiments

Although some embodiments of the technology have been described in the foregoing, the embodiments described above are merely illustrative and should not be construed as limiting the scope of the technology. The novel method and system described herein as example embodiments of the technology may be embodied in the form of any other embodiment. Further, it should be appreciated that various omissions, modifications, and alterations may be made to example embodiments of the technology described herein without departing from the scope as defined by the appended claims. The appended claims and equivalents are intended to encompass such omissions, modifications, and alterations as various embodiments and modification examples of the technology in so far as they fall within the scope of the appended claims or the equivalents thereof.

Each of the first signal processor 9 of the first navigation apparatus 4 and the second signal processor 14 of the second navigation apparatus 5 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the first signal processor 9 and the second signal processor 14 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the first signal processor 9 and the second signal processor 14 illustrated in FIG. 2.

The invention claimed is:

1. A navigation system comprising:
a receiver mounted on a target aircraft, the target aircraft being a target of acquisition of location information, the receiver being configured to receive three or more navigation signals from respective three or more non-target aircrafts, the three or more navigation signals each including location information on a location of corresponding one of the three or more non-target aircrafts, the three or more navigation signals each being transmitted as a radio signal from a navigation apparatus mounted on the corresponding one of the three or more non-target aircrafts; and
a signal processor mounted on the target aircraft, the signal processor being configured to calculate a location of the target aircraft on a basis of the three or more navigation signals.

2. The navigation system according to claim 1, wherein the location of the target aircraft is calculated by hyperbola navigation.

3. The navigation system according to claim 1, wherein each of the three or more navigation signals is transmitted with an output higher than that of a GPS signal.

4. The navigation system according to claim 1, wherein each of the three or more navigation signals is transmitted with a frequency higher than 1950 kilohertz.

5. The navigation system according to claim 1, wherein each of the three or more navigation signals is transmitted as a radio signal of a microwave.

6. An aircraft on which the navigation system according to claim 1 is mounted.

7. A navigation system comprising:
three or more first navigation apparatuses mounted on respective three or more non-target aircrafts, the three or more first navigation apparatuses each being configured to receive three or more satellite navigation signals transmitted from respective three or more artificial satellites, and calculate a location of corresponding one of the three or more non-target aircrafts on a basis of the received three or more satellite navigation signals, the three or more first navigation apparatuses being configured to transmit respective three or more navigation signals as radio signals, the three or more navigation signals each including location information on the calculated location of the corresponding one of the three or more non-target aircrafts; and
a second navigation apparatus mounted on a target aircraft, the target aircraft being a target of acquisition of location information, the second navigation apparatus being configured to receive the three or more navigation signals, and calculate a location of the target aircraft on a basis of the received three or more navigation signals.

8. The navigation system according to claim 7, wherein the location of the target aircraft is calculated by hyperbola navigation.

9. The navigation system according to claim 7, wherein each of the three or more navigation signals is transmitted with an output higher than that of a GPS signal.

10. The navigation system according to claim 7, wherein each of the three or more navigation signals is transmitted with a frequency higher than 1950 kilohertz.

11. The navigation system according to claim 7, wherein each of the three or more navigation signals is transmitted as a radio signal of a microwave.

12. A navigation method of calculating a location of an aircraft by the navigation system according to claim 7, the aircraft being the target of acquisition of the location information.

13. A navigation method of calculating a location of an aircraft by the navigation system according to claim 1, the aircraft being the target of acquisition of the location information.

14. A navigation method comprising:
receiving three or more satellite navigation signals by each of three or more first navigation apparatuses, the three or more satellite navigation signals being transmitted from respective three or more artificial satellites, the three or more first navigation apparatuses being mounted on respective three or more non-target aircrafts in flight;
calculating each of three or more locations of the respective three or more non-target aircrafts on a basis of the received three or more satellite navigation signals;
transmitting, from the respective three or more first navigation apparatus, three or more navigation signals as radio signals, the three or more navigation signals each including location information on the location of corresponding one of the three or more non-target aircrafts;
receiving the three or more navigation signals by a second navigation apparatus, the second navigation apparatus being mounted on a target aircraft in flight, the target aircraft being a target of acquisition of location information; and
calculating a location of the target aircraft on a basis of the received three or more navigation signals.

15. The navigation method according to claim 14, wherein each of the three or more non-target aircrafts flies outside an interfering range of the satellite navigation signals.

16. The navigation method according to claim 14, wherein a distance from each of the three or more non-target aircrafts to the target aircraft is set within 500 kilometers to transmit and receive each of the navigation signals.

17. The navigation method according to claim 15, wherein a distance from each of the three or more non-target aircrafts to the target aircraft is set within 500 kilometers to transmit and receive each of the navigation signals.

\* \* \* \* \*